US012754693B2

(12) United States Patent
Benisty et al.

(10) Patent No.: US 12,754,693 B2
(45) Date of Patent: Oct. 6, 2026

(54) FLEXIBLE AND DYNAMIC MULTI-TABLE OVERLAP CACHE OCCUPATION BITMAP

(71) Applicant: Sandisk Technologies, Inc., Milpitas, CA (US)

(72) Inventors: Shay Benisty, Beer Sheva (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 53 days.

(21) Appl. No.: 18/770,419

(22) Filed: Jul. 11, 2024

(65) Prior Publication Data

US 2026/0016987 A1 Jan. 15, 2026

(51) Int. Cl.
*G06F 3/06* (2006.01)

(52) U.S. Cl.
CPC .......... *G06F 3/0659* (2013.01); *G06F 3/0619* (2013.01); *G06F 3/0679* (2013.01)

(58) Field of Classification Search
CPC ..... G06F 3/0659; G06F 3/0619; G06F 3/0679
See application file for complete search history.

(56) References Cited

U.S. PATENT DOCUMENTS

| | | | | |
|---|---|---|---|---|
| 9,477,596 | B2 * | 10/2016 | Post | G06F 12/0253 |
| 10,691,454 | B2 | 6/2020 | Jin et al. | |
| 10,915,475 | B2 * | 2/2021 | Dubey | G06F 13/1694 |
| 11,301,370 | B2 * | 4/2022 | Pasquale | G06F 3/064 |
| 11,513,959 | B2 | 11/2022 | Simionescu et al. | |
| 11,640,264 | B2 | 5/2023 | Benisty et al. | |
| 11,675,709 | B2 | 6/2023 | D'Eliseo et al. | |
| 2019/0317940 | A1 * | 10/2019 | Bauer | G06F 16/24561 |
| 2023/0067236 | A1 * | 3/2023 | Benisty | G06F 3/061 |
| 2025/0123767 | A1 * | 4/2025 | Taylor | G06F 3/067 |

OTHER PUBLICATIONS

Ahmed Abulila, Vikram Sharma Mailthody, Zaid Qureshi, Jian Huang, Nam Sung Kim, Jinjun Xiong, and Wen-mei Hwu. 2019. FlatFlash: Exploiting the Byte-Accessibility of SSDs within A Unif ied Memory-Storage Hierarchy. Apr. 13-17, 2019, (Year: 2019).*
U.S. Appl. No. 18/610,595, filed Mar. 20, 2024.
U.S. Appl. No. 18/612,349, filed Mar. 21, 2024.

* cited by examiner

*Primary Examiner* — Eric Cardwell
(74) *Attorney, Agent, or Firm* — Patterson + Sheridan, LLP

(57) ABSTRACT

Multiple cache occupation bitmaps are maintained with each successive bitmap having a more focused granularity based upon data hotness or overlay collisions. The bitmap with the least focus is checked first, and if a value of 1 is found for the relevant bit, then a relevant bit of the next, more focused, bitmap that encompasses the address range of the read command is checked. Relevant bits of each additional, more focused bitmap that encompasses the address range for the read command are checked in succession upon finding a value of 1 for the relevant bit in the previous bitmap. Upon the last relevant bit of a bitmap encompassing the address range of the read command having a value of 1 or 0, either a full cache scan is performed or no overlap is present. The bitmaps can be flexibly and dynamically maintained.

17 Claims, 8 Drawing Sheets

300

| DW | 31 24 | 23 16 | 15 8 | 7 0 |
|---|---|---|---|---|
| 0 | FLBA_L | | | |
| 1 | GRP_ID | | FLBA_M | |
| 2 | LENGTH | | | |

FLEXIBLE AND DYNAMIC MULTI-TABLE OVERLAP CACHE OCCUPATION BITMAP

BACKGROUND OF THE DISCLOSURE

Field of the Disclosure

Embodiments of the present disclosure generally relate to reducing overlap table scanning.

Description of the Related Art

Nonvolatile memory (NVM) solid state drives (SSDs) today utilize an overlap mechanism. The overlap mechanism is used to detect any overlap between programming (i.e., executing write commands) and pending read commands. The detection is utilized to protect the atomicity and occasionally, the order of commands. In order to obtain the protection, the overlap table holding all the overlap information is large.

The very basic need for handling an overlap table is to keep atomicity. FIG. 2 demonstrates in diagram 200 the need to validate atomicity by applying such an overlapping mechanism. In FIG. 2, the host issues a read command from logical block address (LBA) 0 to 40, and a write command from LBA 0 to 40. In general, these commands are done in parallel, as the peripheral component interconnect (PCI) express (PCIe) is a full duplex device. When the host has two pending commands for both read and write on overlapping ranges, the host expects to receive the data entirely before the write, or entirely after the write. However, if the data storage device is not aware of the range of the read command, or the read of the range of the write command, it is possible that the returned data for the read command will contain a mix of old data and new data. In this example, LBAs 0-20 and LBAs 30-40 of previous information could be returned, and data for LBAs 20-30 belonging to the new write command could be returned. Hence, a mix of the data could be returned rather than the data from entirely before the write command or from entirely after the write command.

When the host issues a write command, the data storage device fetches the corresponding data associated with the write command. The data storage device then writes the data to the memory device (e.g., NAND) only after posting the completion entry to the host. The writing to the memory device (e.g., NAND), and specifically the programing stage, takes a lot of time, which in turn causes backpressure towards the host. To overcome the backpressure, multiple writes are accumulated, and the programing (e.g., writing) is done only when programming is optimal, after receiving data from multiple commands. However, to allow the data storage device to service more commands, maintain bandwidth, and provide better write quality of service (QoS), the write commands are marked as completed towards the host. These write commands are "cached" until such time when the data associated with the write commands can be programmed to the memory device (e.g., NAND).

Once a write command is completed, an overlapping read command is expected to return the last approved data. However, if the data storage device goes to the memory device (e.g., NAND) to fetch data, the data storage device will not provide the host with the correct data, since the data is not yet in the memory device (e.g., NAND) because the data is still "cached". As such, for every read command, the data storage device needs to make sure the command doesn't overlap with cached writes.

One regular process that happens in the SSDs is garbage collection. The data storage device, to ensure a host read command provides correct data, needs to track the areas that are being read and written back during the garbage collection process.

To improve performance, when the data storage device can predict what will be the next read command, it follows to fetch that data from the memory device (e.g., NAND) prior to receiving the read command (i.e., early fetch). To gain from the early fetches, the data storage device needs to track which LBA ranges have been fetched, so that if a read (or write) command arrives to read (or write) the tracked LBA range, the data storage device will detect that the LBA range has already been fetched, and will skip re-fetching (or drop previous fetch in case of an overlapping write).

The reasons mentioned above, as well as others, dictate the holding of an overlap table. Since many commands are supported in parallel (i.e., many outstanding cached write ranges, etc.), the overlap table is quite large. FIG. 3 depicts an example 300 of the size of a single entry in an overlap table. In FIG. 3, {FLBA_M, FLBA_L} is the start an LBA of the command, and LENGTH is the size of the command. Together the start of the LBA command and the length comprise the total range of the entry. GRP_ID is used by the hardware (HW) and firmware (FW) to manage a number of ranges belonging to the same group. The overlap table is expected to keep growing as PCIe speed advances.

For high queue depths, random read performance dictates that a new command arrives frequently, and care needs to be taken to compensate for any bubbles in the flow of the arriving command. It should be noted that when working with low queue depth, the latency becomes an important metric to meet. As SSDs advance, performance advances, which leads to overlap table size increases.

For every command that arrives, usually from the host but sometimes due to internal use like garbage collection, the entire pending program commands database needs to be scanned for overlaps. As the database is already quite long, and growing, high queue depth can't be endured when bandwidth is critical.

Therefore, there is a need in the art for an improved overlap mechanism.

SUMMARY OF THE DISCLOSURE

Multiple cache occupation bitmaps are maintained with each successive bitmap having a more focused granularity based upon data hotness or overlay collisions. The bitmap with the least focus is checked first, and if a value of 1 is found for the relevant bit, then a relevant bit of the next, more focused, bitmap that encompasses the address range of the read command is checked. Relevant bits of each additional, more focused bitmap that encompasses the address range for the read command are checked in succession upon finding a value of 1 for the relevant bit in the previous bitmap. Upon the last relevant bit of a bitmap encompassing the address range of the read command having a value of 1 or 0, either a full cache scan is performed or no overlap is present. The bitmaps can be flexibly and dynamically maintained.

In one embodiment, a data storage device comprises: a memory device; and a controller coupled to the memory device, wherein the controller is configured to: receive a read command to read data from the memory device; check a first relevant bit of a first bitmap; determine that the first relevant bit of the first bitmap is equal to 1; check a second relevant bit of a second bitmap; and determine whether a cache overlap is detected.

In another embodiment, a data storage device comprises: a memory device; and a controller coupled to the memory device, wherein the controller is configured to: maintain a first bitmap, wherein the first bitmap corresponds to a first granularity of a storage address range of the memory device; and maintain a second bitmap, wherein the second bitmap corresponds to a second granularity of the storage address range, wherein the second granularity is a higher resolution than the first granularity.

In another embodiment, a data storage device comprises: means to store data; and a controller coupled to the means to store data, wherein the controller is configured to: maintain a plurality of bitmaps, wherein the plurality of bitmaps correspond to storage address ranges of the means to store data, wherein at least two bitmaps of the plurality of bitmaps have different granularities; determine whether relevant bits of the at least two bitmaps have a value equal to 1; and perform a full cache scan upon determining the relevant bits have a value equal to 1.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Multiple cache occupation bitmaps are maintained with each successive bitmap having a more focused granularity based upon data hotness or overlay collisions. The bitmap with the least focus is checked first, and if a value of 1 is found for the relevant bit, then a relevant bit of the next, more focused, bitmap that encompasses the address range of the read command is checked. Relevant bits of each additional, more focused bitmap that encompasses the address range for the read command are checked in succession upon finding a value of 1 for the relevant bit in the previous bitmap. Upon the last relevant bit of a bitmap encompassing the address range of the read command having a value of 1 or 0, either a full cache scan is performed or no overlap is present. The bitmaps can be flexibly and dynamically maintained.

Figure 1:
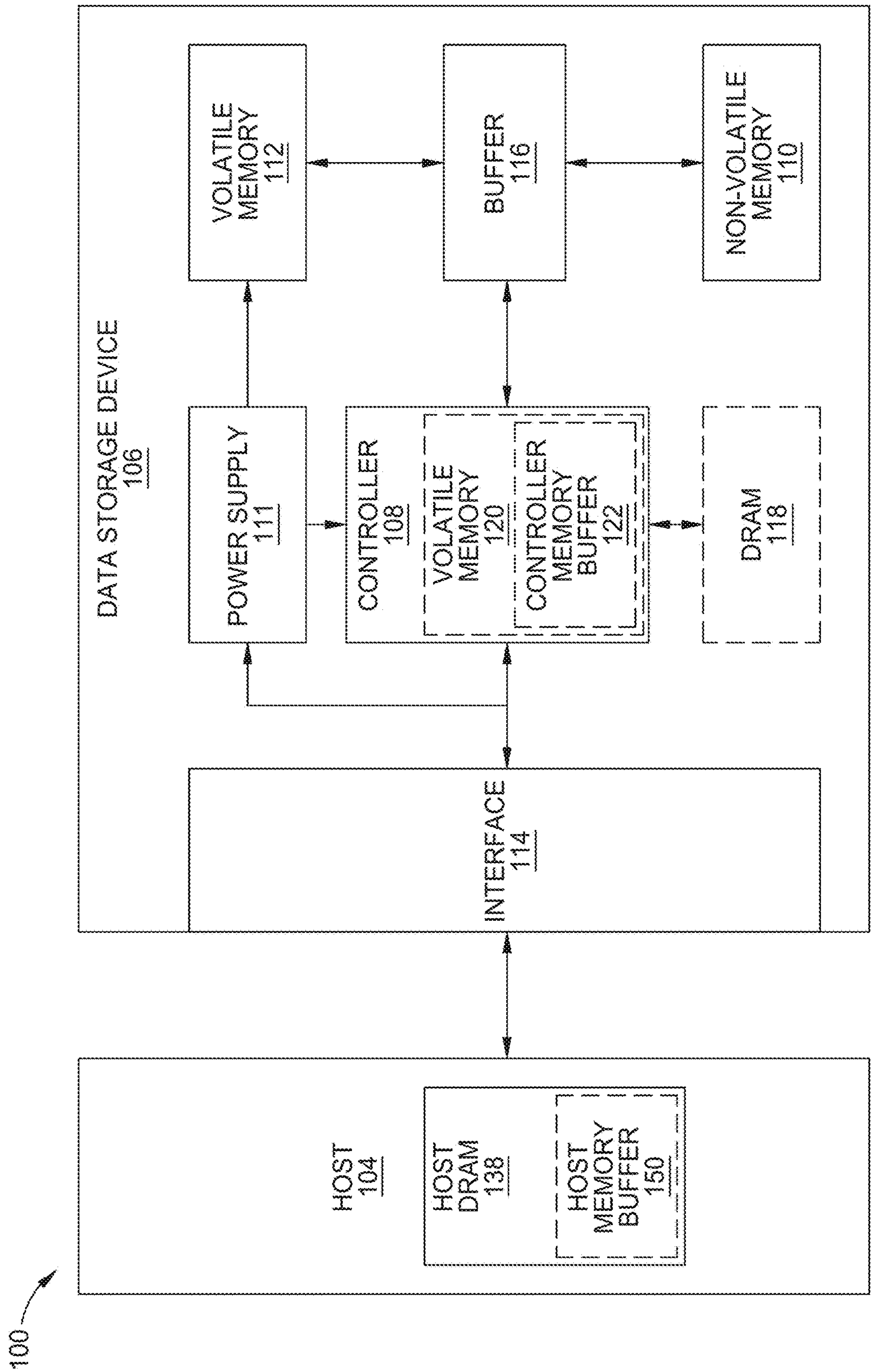
FIG. 1 is a schematic block diagram illustrating a storage system in which a data storage device may function as a storage device for a host device, according to certain embodiments.
Figures 2, 3:
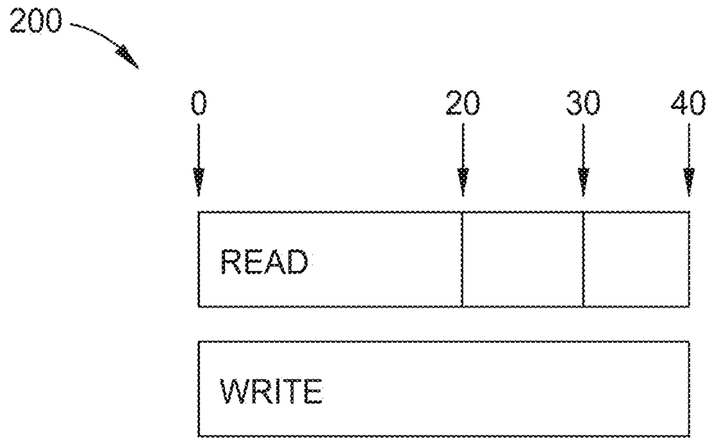
FIG. 2 is a schematic illustration of an overlap problem.
FIG. 3 is a schematic illustration of a single entry of an overlap table according to one embodiment.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 4:
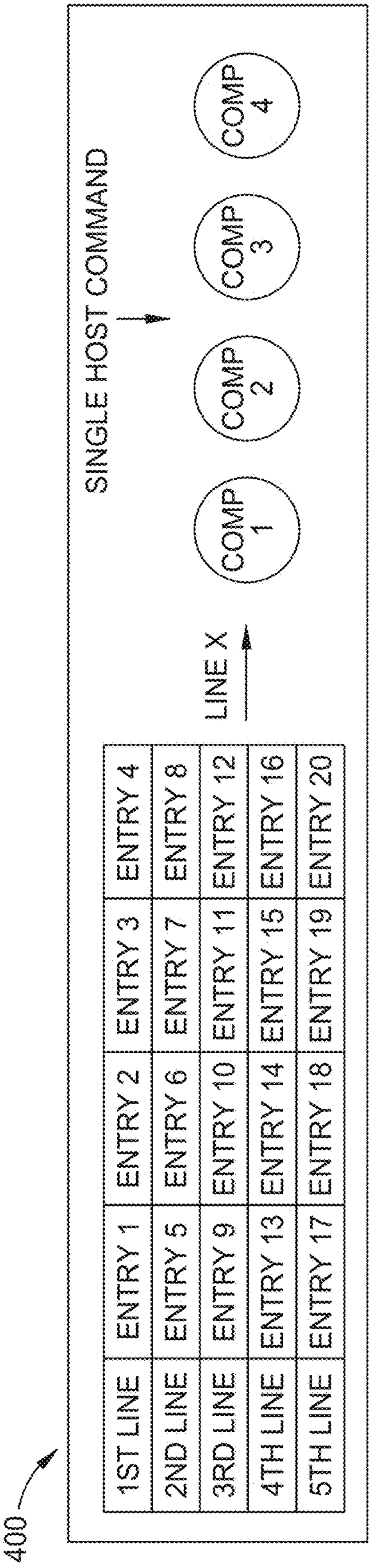
FIG. 4 is a schematic illustration of storing multiple entries in a single line of an overlap table.
Figure 5:
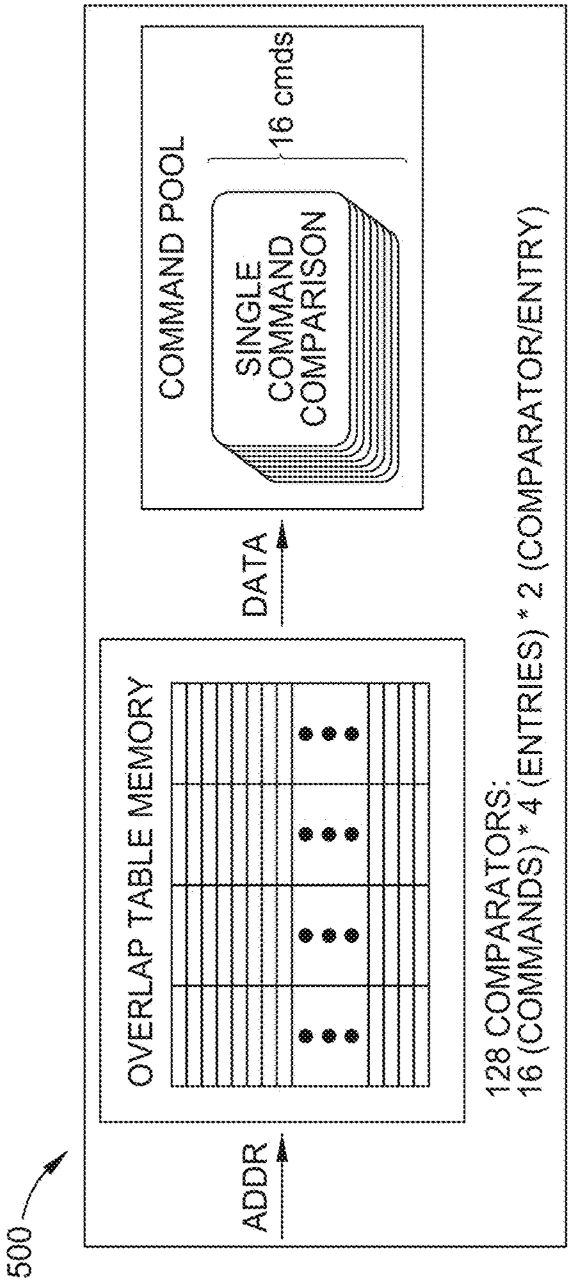
FIG. 5 is a schematic illustration of a parallel command comparison.

To deal with the overlap table scanning issue, there are multiple approaches possible. It is noted that the overlap table is disposed within the controller. One such method is to increase the memory width to four ranges (for example), referred to as "Entries" at one line, thus decreasing the number of lines. FIG. 4 is a schematic illustration 400 of storing multiple entries in a single line of an overlap table. While increasing the width decreases the number of lines, there is only so long that such a solution will be viable. With a continual increase in size, the width or number of lines or a combination of both will lead to an ever expanding overlap table that will need to be searched. Another possibility is to increase the frequency, however even for 7 nm processes, it will become impossible to generate logic at much faster rates than 1 GHz. Yet another possibility is introducing smart search algorithms, but using smart search algorithms is a very complex solution. Another possibility is to parallelize the number of commands on which the search is performed based upon the queue depth. FIG. 5 is a schematic illustration 500 of a parallel command comparison. However, such a parallelism solution has a price of HW complexity and power consumption, which are traded-off versus the search execution latency. Parallelized commands still suffers from being a full-scale exhaustive search nature, at which each entry of the pending program commands cache should be scanned and compared to each new read command. Although parallelized commands allows a tradeoff between the search latency and HW complexity and power consumption, such a full-scale search approach is an expensive and performance limiting factor as technology scales. It would be desired to enable a simple solution that will allow to scan only a limited range of the pending program commands cache.

Figure 6:
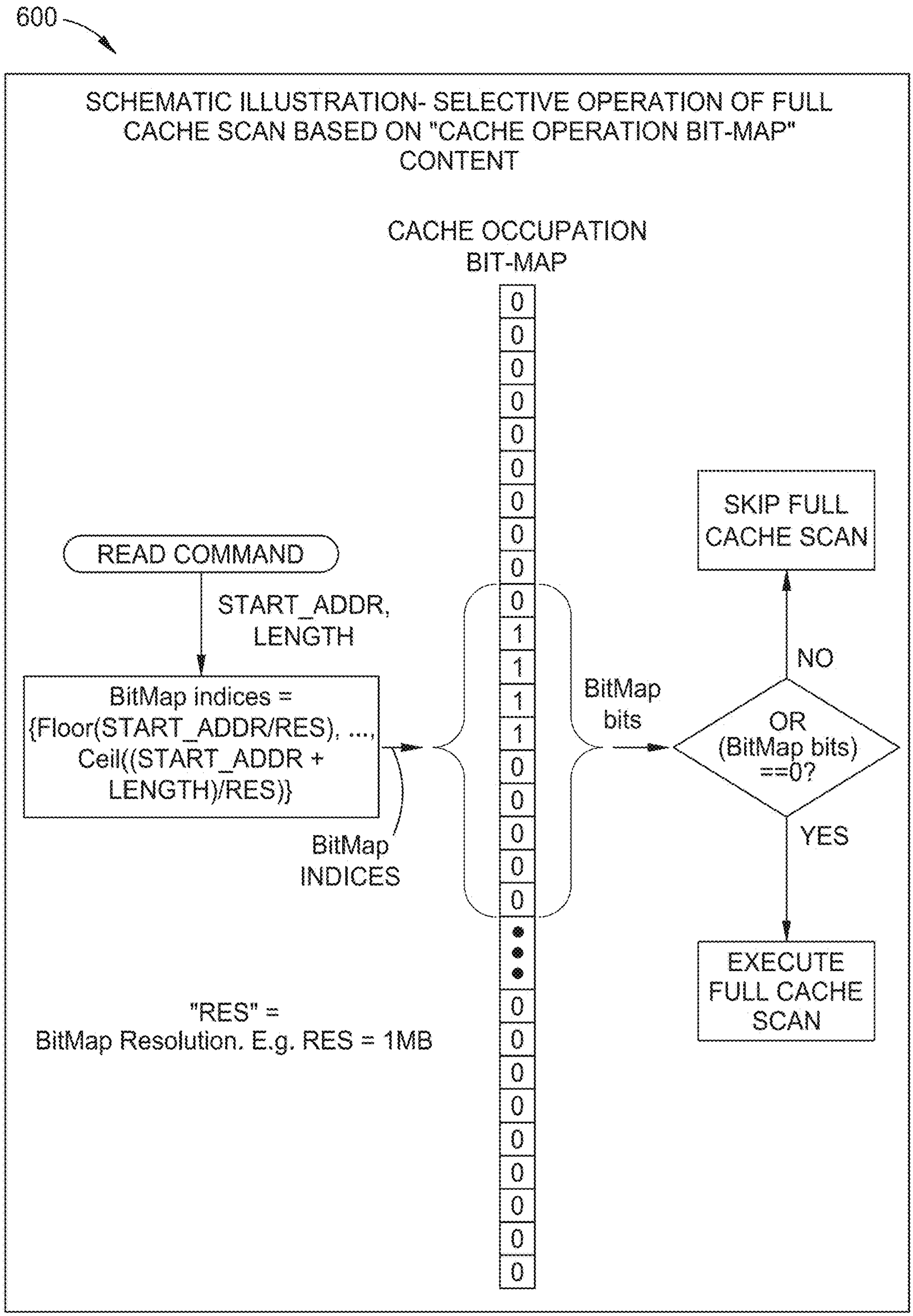
FIG. 6 is a schematic illustration of selective operation of a full cache scan based on cache operation bitmap content.

Yet another possibility involves checking if the address-range of the read command is indicated at the bit-map, and then execute the full-search only at such an initial overlap indication. The possibility occurs instead of scanning the whole cache for each read command. For every read command that enters, either originated from the host of internally, for example during garbage collection, calculate the relevant bits at the bitmap for current read command as shown in FIG. 6 and check whether any of these bits at the bitmap is marked as 1 (which indicates that current read command has an overlap with one or more of the commands placed at the pending-prog-commands-cache). Although the approach allows minimizing the full-scan searches of the pending-prog-commands-cache while working on random-access data; when the read-commands represent a sequential read (i.e., breakdown of read request of large data chunks into successive read commands of adjacent addresses), it is suboptimal due to expected clusters of adjacent events of full-scan of the cache. Take for example a write command to address 0. As the bitmap has granularity of 1 MB, for example, the relevant bit which refers to first MB addresses of the storage is turned to 1. When a sequential read command for reading the first MB at the storage arrives, the command will be broken down to a sequence of 256 "small" read commands, each for reading 4 KB in a consequential manner. As the first of bitmap is turned on, all 256 consequent read commands will be indicated to have an overlap and, as a result, all will require full scan of the pending-prog-commands-cache.

Another possibility is to allow spread-along-time of such cache-scans clusters, achieved either by randomized bitmap at which each bit at the cache-occupation-bitmap will represent a collection of 1 MB non-consequent addresses along storage address range; or by reordering of read commands execution, at which consequent read commands that require scan of pending-prog-commands-cache will be delayed as to break sequences of cache scans. Regardless, all previous approaches lack by a fixed pre-determined allocated granularity of the cache-occupation bitmap, which has no flexibility to allocate different address ranges sizes in accordance with the access-frequency (hot/cold) level of each address range.

The disclosure details a flexible and dynamic representation allocation of the cache occupation bitmap, such that address ranges which are more frequently accessed (i.e., "hot areas") will be represented at the bitmap in higher resolution (e.g., 4 B per bit of cache bitmap), whereas "cold areas" are represented with lower resolution (e.g., 128 MB per each bit of the bitmap). In that manner, the overall amount of redundant overlap alerts, caused by poor resolution of the bitmap, is minimized as search operations on the cold regions are performed.

The flexible representation allocation of the cache occupation bitmap is achieved by allocating several bitmap tables, each with a different length. Each bitmap is associated with a different "hotness" level of the data and represents a different address granularity. The first bitmap, the bitmap with the lowest resolution (e.g., 128 MB per bit), covers the whole address range of the memory array, whereas the other bitmaps will cover only specific regions in a dynamic manner. These bitmaps tables are checked in a serial manner for a read operation such that only if the relevant bit is marked as occupied (e.g., 1) in the lower-granularity bitmap table, the proceeding bitmap tables are checked. Doing so allows achieving dramatic reduction of bitmap table size, and still minimizes search operations of the overlap table.

The "hotness-grade" of the different address regions might be dynamically tracked by data temperature detection, such as stream detection logic, and the allocation of higher resolution bitmaps can be dynamically allocated according to the current "hotness" level indications. The basic bitmap will cover the whole address range with the lowest resolution (e.g., each bitmap bit represents 128 MB of data at the address range). Each further bitmap level associated with "hotter" regions of the memory address range will cover only specific parts of the memory address range and not the whole range. It should be noted that each added bitmap focuses on a smaller range of the previous bitmap by referring to sub-regions with higher "hotness" levels.

Figure 7:
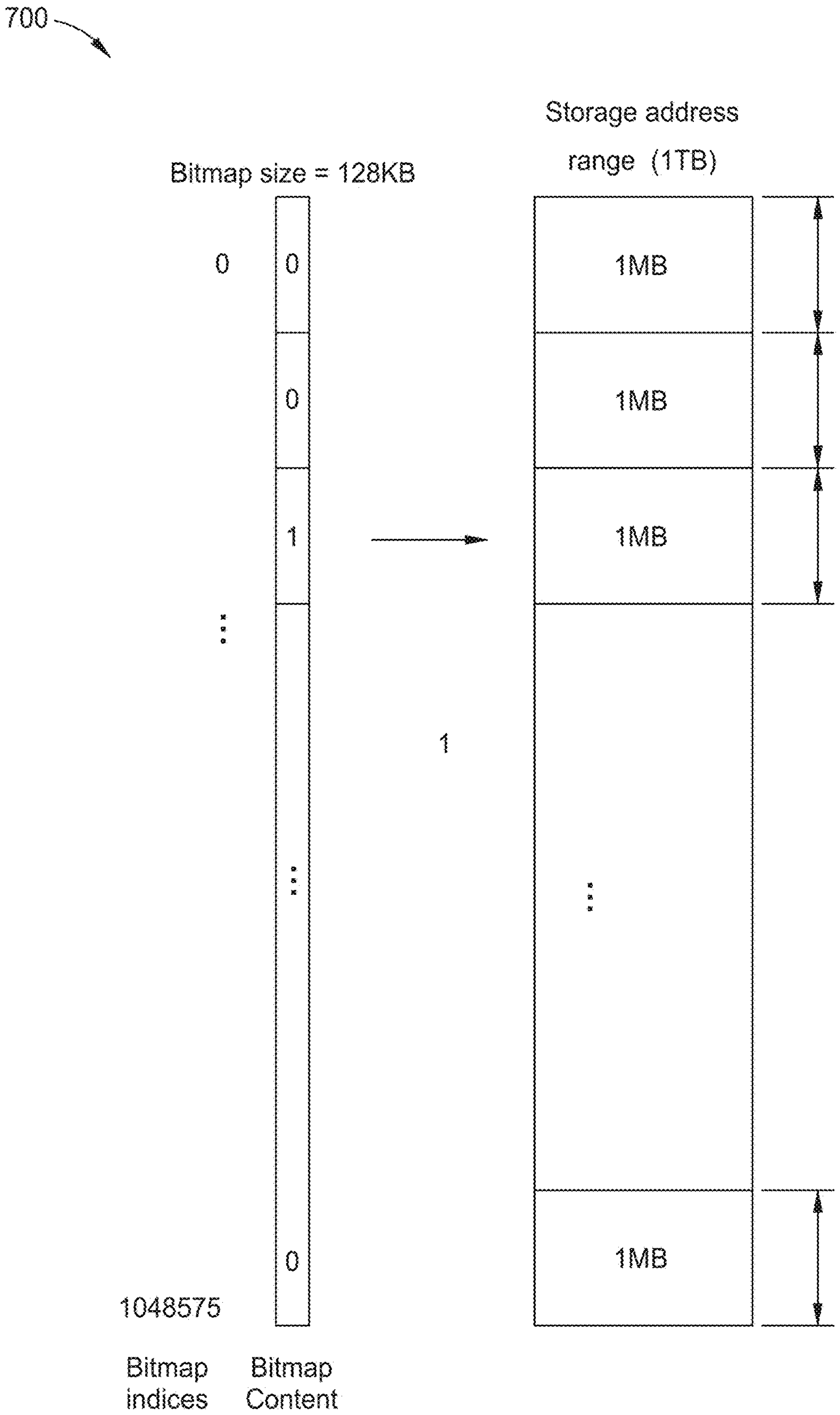
FIG. 7 is a schematic illustration of a fixed allocation of cache occupation bitmap.
Figure 8:
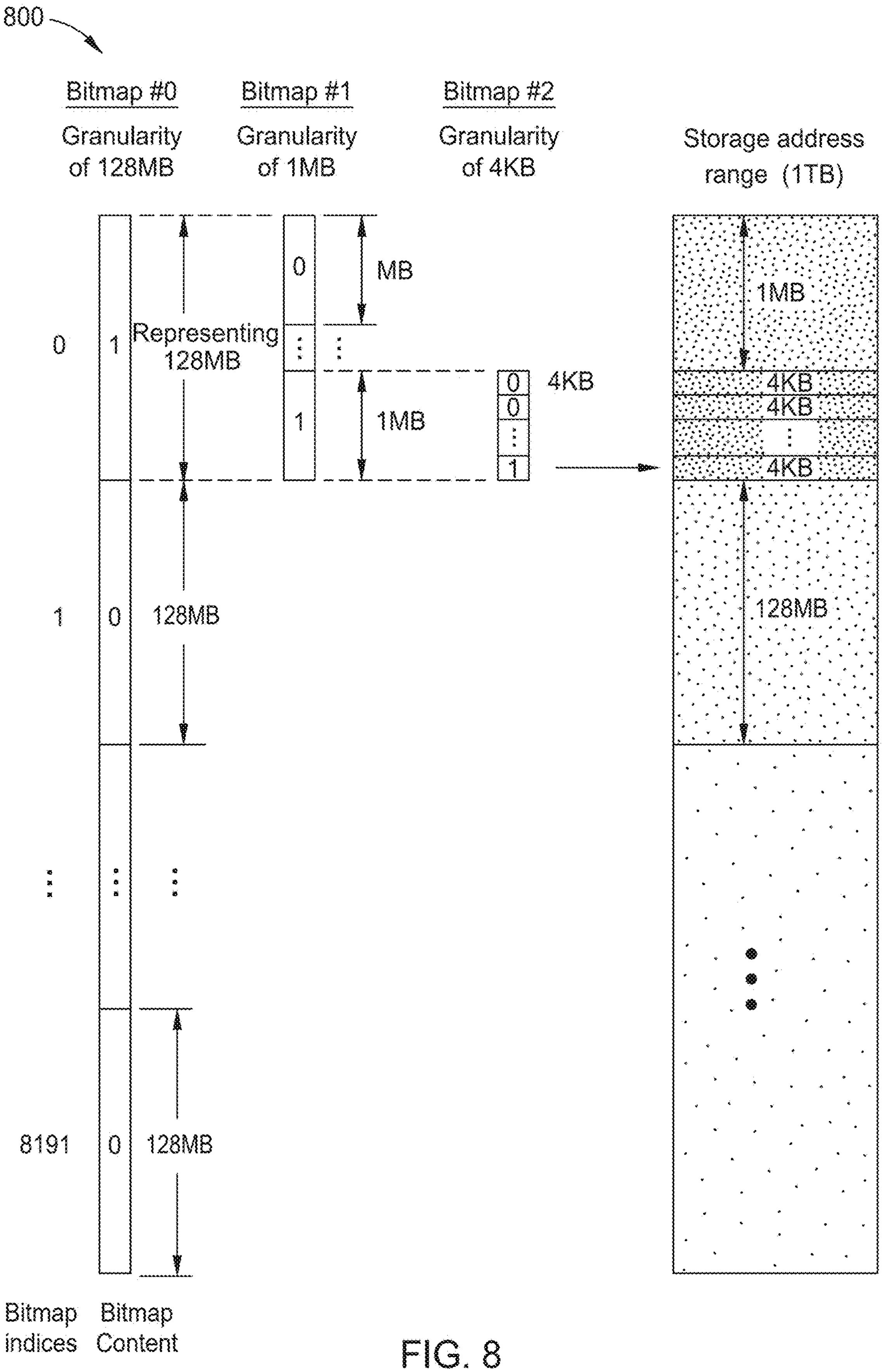
FIG. 8 is a schematic illustration of a flexible allocation of cache occupation bitmap.
Figure 9:
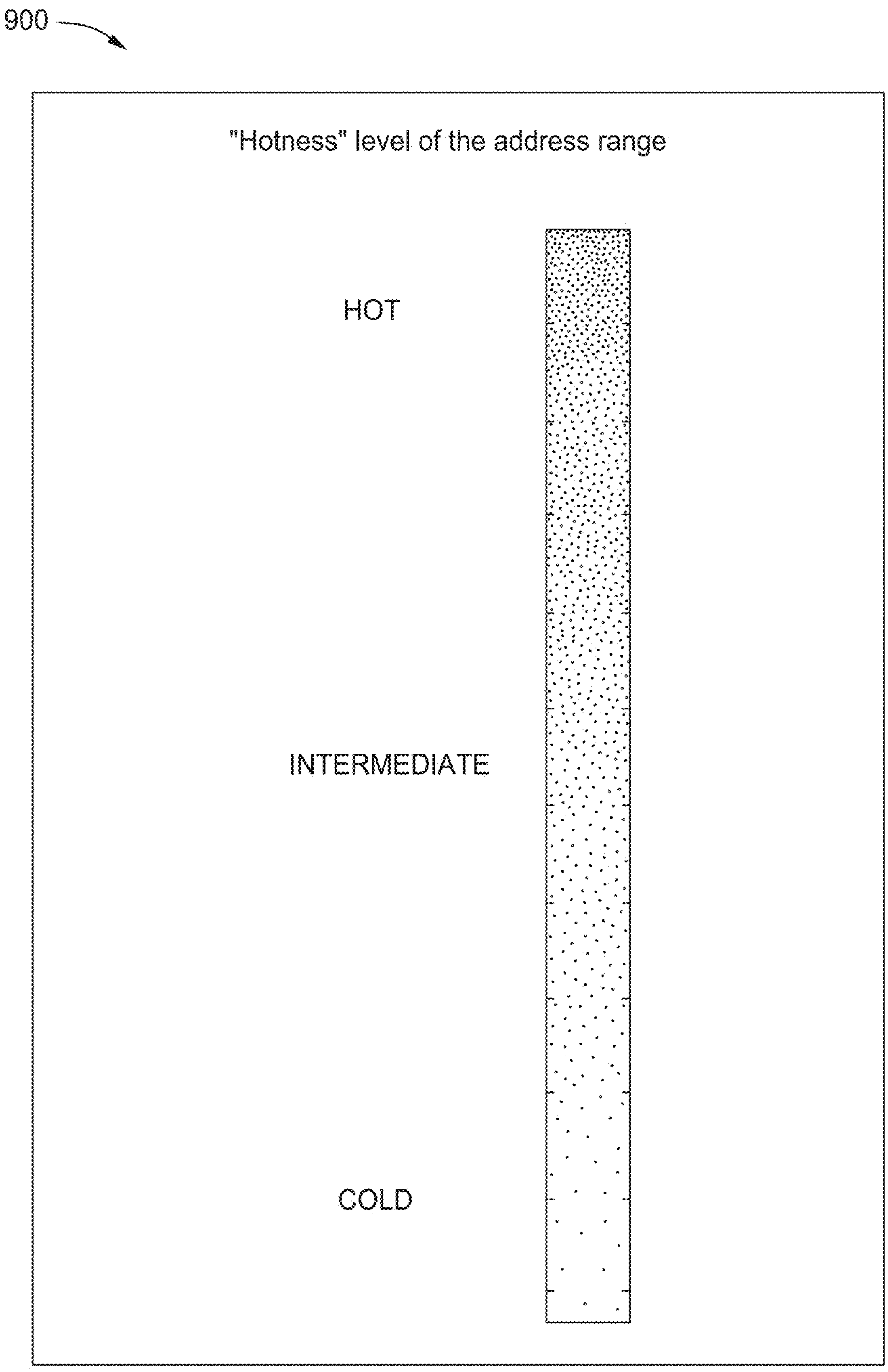
FIG. 9 is a schematic illustration of a data heat range.

An illustrative comparison of the proposed flexible representation allocation of the address ranges at the cache occupation bitmap, versus the traditional fixed allocation, appears in FIGS. 7-9. FIG. 7 is a schematic illustration of a fixed allocation of cache occupation bitmap. FIG. 8 is a schematic illustration of a flexible allocation of cache occupation bitmap. FIG. 9 is a schematic illustration of a data heat range. FIGS. 7-9 illustrate a fixed versus flexible representation allocation of the cache occupation bitmap. It is to be noted that the illustrated chunk sizes are not to scale and are for exemplification purposes only as the chunk size, and hence bitmap size, is customizable. Additionally, while only three hotness levels are shown as an example, it is to be understood that more hotness levels, or simply two hotness levels, are contemplated.

In FIG. 7, the bitmap is arranged to be one bit per 1 MB of storage address range. Whenever a read command is received, the bitmap is checked according to the LBA and if the value is 0 for the relevant bit, the search of the overlap table is not necessary. If the relevant bit is 1, only in this case will the full overlap table be searched in order to make sure there really is an overlap scenario. Thus, the granularity of the bitmap is 1 MB. In the cache, there might only be 4K from this 1 MB that is overlapped.

In regards to FIG. 7, the illustration 700 shows a fixed bitmap allocation of the cache occupation bitmap. In FIG. 7, the bitmap size is exemplified to be 128 KB and covers a storage address range of 1 TB in 1 MB chunks. Thus, there are 1,048,575 total bitmap indices. It is to be understood that the resolution (i.e., chunk size) and bitmap size are examples only. The bitmap will have each bit as either 1 or 0 where 1 indicates that there is an update in the overlap table cache for an address within the chunk and a 0 indicates that there are no updates for an address within the chunk. It is to be noted that all storage address ranges are represented in a fixed resolution, 1 MB in FIG. 7, in the cache occupation bitmap regardless of different hotness levels. It also is to be noted that for FIG. 7, the bitmap cannot be adapted to a high representation granularity to hot areas. Therefore, FIG. 7 represents a fixed trade-off between search complexity and area and cost due to the size of the bitmap table resolution.

As shown in FIG. 8, the flexible allocation of cache occupation bitmap is shown. Instead of having a single bitmap, there are multiple bitmaps. During programming, the relevant bits of all bitmaps are updated, where during a read operation the bitmaps are examined in a serial manner such that the ("most-left") lowest resolution bitmap as shown in FIG. 8 that covers the whole address range is checked first and then, move on to the higher resolution bitmap only in cases where the relevant bit in the previous bitmap indicates a value of 1 (i.e., an occupied region). In that way, the need to check whole bitmaps is saved most of the time. The overall bitmap table size is much smaller than in FIG. 7, but covers the same amount of memory (i.e., 1 TB). Additionally, FIG. 8 shows the exact pointing to specifically occupied LBAs, note the 4 KB resolution in the example, and saves the need to search for other LBAs. The search operation can be minimized as a part of optimizing the trade-off between bitmap table size and search operation duration. In FIG. 8, the address ranges that are more frequently accessed (i.e., hot areas), are represented in the bitmap in higher resolution whereas cold areas are represented with a lower resolution.

More specifically in regards to FIG. 8, the first bitmap, just as an example, has a single bit for every 128 MB of memory. The next bitmap will be limited and will not be for the entire media. Rather, the second bitmap will be limited for a specific zone and will have a better granularity than the first bitmap. For example, the second bitmap is exemplified to cover one bit for 1 MB. The next bitmap will also not cover everything. The third bitmap would be for a very small zone, but the third bitmap will have will have a much better granularity. The bitmaps will be allocated dynamically based on the hotness or the temperature of the data, whether the data is hot data, cold data, or something in the middle. Thus, the bitmaps are allocated and better performance will be achieved.

More specifically in regards to FIG. 8, the overall bitmap table size, collectively, is about 1.03 KB, and there are three separate bitmap tables. The bitmaps have different resolutions and different lengths. Bitmap #0 has a granularity of 128 MB and thus has 8191 bitmap indices with each index covering 128 MB of the total 1 TB of storage address range. Bitmap #1 has a granularity of 1 MB and covers only bitmap index 0 of Bitmap #0. Hence, Bitmap #1 covers 128 MB total of the 1 TB storage address range. Bitmap #1 thus has 128 bitmap indices with each index representing 1 MB. Bitmap #1 covers just a subset of what Bitmap #0 covers of the storage address range. Bitmap #2 covers just a subset of Bitmap #1 and has a granularity of 4 KB and covers only 1 index of Bitmap #1 for a coverage of only 1 MB of the total storage address range. As shown by the storage address range on the right of FIG. 8, Bitmap #2 focuses on the hottest addresses of the storage address range. While it is shown in FIG. 8 that there is only 1 bitmap at the Bitmap #1 level and only 1 bitmap at the Bitmap #2 level, it is contemplated that there can be multiple bitmaps at the same bitmap level if desired to ensure appropriate coverage of the hottest addresses. Additionally, any bitmaps that cover less than the entire storage address range are dynamic and may change over time based upon data collected by the controller.

The first bitmap covers the entire media. The intermediate bitmap will not cover everything, but rather, will just cover, in this example, 128 MB of the media. The intermediate bitmap can be played with to define what zone is covered. Hence, the intermediate bitmap is dynamic. The zone coverage for the intermediate bitmap can change dynamically and has much better granularity than the first bitmap. Specifically, one bit per 1 MB. It is contemplated that while one intermediate bitmap is shown, multiple intermediate bitmaps are contemplated. For the third bitmap, the granularity is even better. More specifically, the granularity is 4 KB in the third bitmap for example.

The allocation of the bitmaps is based on the hotness level of the address range as exemplified in FIGS. 8 and 9. For data that is neither hot nor cold, the third bitmap won't correspond in the example of FIG. 8, but the intermediate bitmap will correspond in the example of FIG. 8. Specifically it is one bit per 1 MB because the temperature is in the middle of the hot and cold middle. For the cold data there is a single bit per 128 MB. Ideally, if there was no constraint in the storage device, one bit per 4 KB could be implemented, but the device would be huge and not practical. Thus, based on the of the hotness level of the data, a decision is made regarding which piece of the data will be the finest granularity bitmap. Additionally, it is to be noted that there may be multiple third bitmaps that can be configured dynamically.

Whenever receiving a read command, a comparison is performed for the first bitmap. If the value is 0, the command can be executed, but if the value is 1, the second bitmap is checked. If the second bitmap has a value is 0, the command can be executed. If the value is 0, then the third bitmap is checked, and so on. As another example, if the first bitmap has a value of 1, but the address isn't in the second bitmap (i.e., the address is for cold data), then a full cache scan will occur. If the multiple bitmaps have been arranged perfectly, then the value of 1 is for cold data. It would be a very rare scenario because the chances that there will be an overlap in the cold data is minimal.

Figure 10:
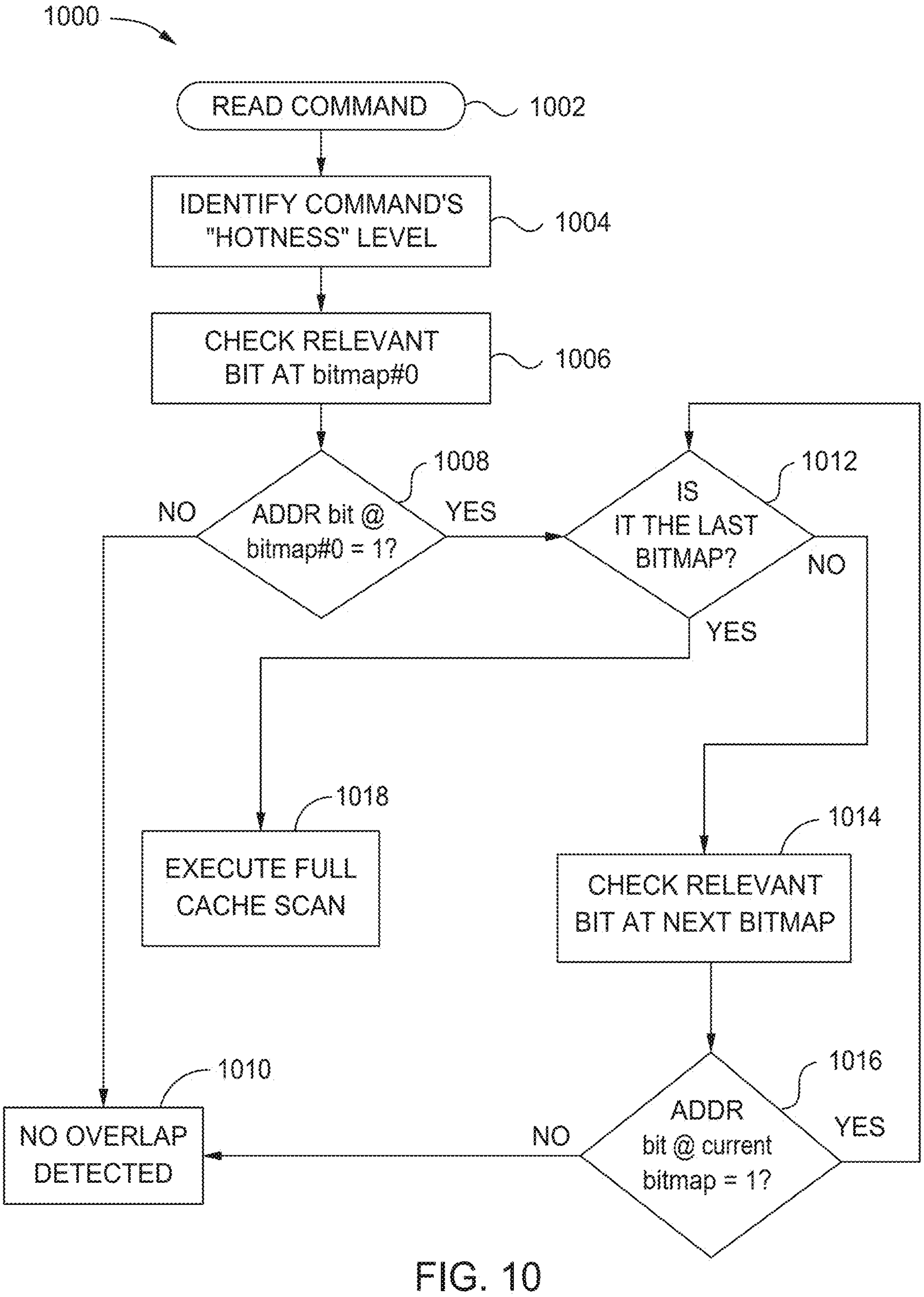
FIG. 10 is a flowchart illustrating a cache occupation bitmap checking procedure.

FIG. 10 is a flowchart 1000 illustrating a cache occupation bitmap checking procedure according to one embodiment. FIG. 10 describes the cache occupation bitmaps checking procedure toward decision if a cache scan is required for overlap detection.

Generally speaking, there is a read command, and the read command's hotness level is identified and the relevant bit is checked at the first bitmap. If the value is 0, then there is no collision and the command can be executed. If the value is 1 then a determination is made regarding whether the bitmap is the last bitmap. If yes, then the full cache scan is executed. Alternatively, it is contemplated that the command can be paused to wait until the bit would be 0 after programming. If the bitmap is not the last bitmap, then the relevant bit is checked at the next bitmap. If the relevant bit is 0, no overlap is detected and the command can be executed. If the value is 1, then a determination is made regarding whether the bitmap is the last bitmap, and so on until either a relevant bit is 0 or there are no more bitmaps to check.

More specifically in regards to FIG. 10, a read command is received at block 1002 and the command's 'hotness' level is identified at block 1004. The relevant bit at the first bitmap, Bitmap #0, is checked at block 1006. The relevant bit is the bit that corresponds to the address associated with the read command. A determination is made at block 1008 regarding whether the relevant bit is equal to 1. If the relevant bit does not equal 1, then there is no overlap detected and the command can be executed at block 1010. If the relevant bit is equal to 1, then a determination is made at block 1012 regarding whether the bitmap is the last bitmap. If the bitmap is the last bitmap, then a full cache scan is executed at block 1018 because the value of the relevant bit for the last bitmap is equal to 1. If the bitmap is not the last bitmap, then the relevant bit of the next bitmap is checked at block 1014. At block 1016, a determination is made regarding whether the relevant bit is equal to 1. If the relevant bit is not equal to 1, then there is no overlap and the method proceeds to block 1010. If the value is 1, then the method proceeds back to block 1012.

In another embodiment, the non-uniform granularity of the bitmap representation could be adapted according to a number of overlay collision events, as another indication on top of the access-frequency ("hotness") level. If the collision rate for a specific zone is very high, a specific bitmap for the zone can be used because the zone has a very high collision rate. Thus, the bitmaps can be based on the temperature, the collision rate, or both.

The disclosure has major advantages in cost, latency, and power by reducing the number of searches/full-scans of the pending-prog-commands-cache versus previous approaches. The dynamic and flexible bitmaps allow optimized trade-off between allocated bitmap tables and the accuracy of pointed out cache overlap scenarios.

In one embodiment, a data storage device comprises: a memory device; and a controller coupled to the memory device, wherein the controller is configured to: receive a read command to read data from the memory device; check a first relevant bit of a first bitmap; determine that the first relevant bit of the first bitmap is equal to 1; check a second relevant bit of a second bitmap; and determine whether a cache overlap is detected. The controller is configured to determine whether the second bitmap is a last bitmap. The controller is configured to execute a full scan upon determining that the second relevant bit is equal to 1 and that the second bitmap is the last bitmap. The controller is configured to update the first relevant bit and the second relevant bit during programming. The first bitmap corresponds to a first address range, wherein the second bitmap corresponds to a second address range, and wherein the second address range is a subset of the first address range. The second address range has a hotness level that is hotter than a remaining address range of the first address range that does not include the second address range, and wherein the hotness level is an indication of read or write access to a range, and wherein hotter indicates that a range is accessed more frequently than a colder range. The controller is configured to wait to read data for the read command until the second relevant bit is equal to 0. The controller is configured to determine a hotness level of the read command. The controller is configured to maintain a non-uniform granularity of the first bitmap and the second bitmap according to a number of overlay collision events. The controller is configured to maintain a non-uniform granularity of the first bitmap and the second bitmap according to access frequency.

In another embodiment, a data storage device comprises: a memory device; and a controller coupled to the memory device, wherein the controller is configured to: maintain a first bitmap, wherein the first bitmap corresponds to a first granularity of a storage address range of the memory device; and maintain a second bitmap, wherein the second bitmap corresponds to a second granularity of the storage address range, wherein the second granularity is a higher resolution than the first granularity. The first bitmap covers a first address range, wherein the first address range is an entirety of the storage address range, wherein the second bitmap covers a second address range, and wherein the second address range is less than the entirety of the storage address range. The second address range is dynamic. The second address range is adjusted based upon access frequency of the storage address range. The second address range is adjusted based upon a number of overlay collision events of the storage address range. The controller is configured to check a relevant bit of the first bitmap in response to receiving a read command. The controller is configured to check a relevant bit of the second bitmap upon determining the relevant bit of the first bitmap is equal to 1.

In another embodiment, a data storage device comprises: means to store data; and a controller coupled to the means to store data, wherein the controller is configured to: maintain a plurality of bitmaps, wherein the plurality of bitmaps correspond to storage address ranges of the means to store data, wherein at least two bitmaps of the plurality of bitmaps have different granularities; determine whether relevant bits of the at least two bitmaps have a value equal to 1; and perform a full cache scan upon determining the relevant bits have a value equal to 1. The maintaining comprises adjusting an address range for at least one bitmap of the plurality of bitmaps. The adjusting is based upon access frequency of the address range.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive a read command to read data from the memory device;
check a first relevant bit of a first bitmap;
determine that the first relevant bit of the first bitmap is equal to 1;
check a second relevant bit of a second bitmap; and
determine whether a cache overlap is detected, wherein the controller is configured to determine whether the second bitmap is a last bitmap, wherein the controller is configured to execute a full scan upon determining that the second relevant bit is equal to 1 and that the second bitmap is the last bitmap.

2. The data storage device of claim 1, wherein the controller is configured to update the first relevant bit and the second relevant bit during programming.

3. The data storage device of claim 1, wherein the first bitmap corresponds to a first address range, wherein the second bitmap corresponds to a second address range, and wherein the second address range is a subset of the first address range.

4. The data storage device of claim 3, wherein the second address range has a hotness level that is hotter than a remaining address range of the first address range that does not include the second address range, and wherein the hotness level is an indication of read or write access to a range, and wherein hotter indicates that a range is accessed more frequently than a colder range.

5. The data storage device of claim 1, wherein the controller is configured to determine a hotness level of the read command.

6. The data storage device of claim 1, wherein the controller is configured to maintain a non-uniform granularity of the first bitmap and the second bitmap according to a number of overlay collision events.

7. The data storage device of claim 1, wherein the controller is configured to maintain a non-uniform granularity of the first bitmap and the second bitmap according to access frequency.

8. A data storage device, comprising:
a memory device; and
a controller coupled to the memory device, wherein the controller is configured to:
receive a read command to read data from the memory device;
check a first relevant bit of a first bitmap;
determine that the first relevant bit of the first bitmap is equal to 1;
check a second relevant bit of a second bitmap; and
determine whether a cache overlap is detected, wherein the controller is configured to wait to read data for the read command until the second relevant bit is equal to 0.

9. A data storage device, comprising:
a memory device; and
a controller coupled to the memory device, wherein the controller is configured to:
maintain a first bitmap, wherein the first bitmap corresponds to a first granularity of a storage address range of the memory device; and
maintain a second bitmap, wherein the second bitmap corresponds to a second granularity of the storage address range, wherein the second granularity is a higher resolution than the first granularity, wherein the first bitmap covers a first address range, wherein the first address range is an entirety of the storage address range, wherein the second bitmap covers a second address range, and wherein the second address range is less than the entirety of the storage address range.

10. The data storage device of claim 9, wherein the second address range is dynamic.

11. The data storage device of claim 10, wherein the second address range is adjusted based upon access frequency of the storage address range.

12. The data storage device of claim 10, wherein the second address range is adjusted based upon a number of overlay collision events of the storage address range.

13. The data storage device of claim 9, wherein the controller is configured to check a relevant bit of the first bitmap in response to receiving a read command.

14. A data storage device, comprising:
a memory device; and
a controller coupled to the memory device, wherein the controller is configured to:
maintain a first bitmap, wherein the first bitmap corresponds to a first granularity of a storage address range of the memory device; and
maintain a second bitmap, wherein the second bitmap corresponds to a second granularity of the storage address range, wherein the second granularity is a higher resolution than the first granularity, wherein the controller is configured to check a relevant bit of the first bitmap in response to receiving a read command, wherein the controller is configured to check a relevant bit of the second bitmap upon determining the relevant bit of the first bitmap is equal to 1.

15. A data storage device, comprising:
means to store data; and
a controller coupled to the means to store data, wherein the controller is configured to:
maintain a plurality of bitmaps, wherein the plurality of bitmaps correspond to storage address ranges of the means to store data, wherein at least two bitmaps of the plurality of bitmaps have different granularities;
determine whether relevant bits of the at least two bitmaps have a value equal to 1; and
perform a full cache scan upon determining the relevant bits have a value equal to 1.

16. The data storage device of claim 15, wherein the maintaining comprises adjusting an address range for at least one bitmap of the plurality of bitmaps.

17. The data storage device of claim 16, wherein the adjusting is based upon access frequency of the address range.

* * * * *